Oct. 21, 1952     H. T. KRAFT     2,614,952

TIRE BUILDING MACHINE

Filed Nov. 2, 1950     10 Sheets—Sheet 1

Fig. 1

INVENTOR
*Herman T. Kraft*
BY *Evans & McCoy*
ATTORNEYS

Oct. 21, 1952     H. T. KRAFT     2,614,952
TIRE BUILDING MACHINE
Filed Nov. 2, 1950     10 Sheets-Sheet 3

INVENTOR
*Herman T. Kraft*
BY *Evans & McCoy*
ATTORNEYS

Oct. 21, 1952    H. T. KRAFT    2,614,952
TIRE BUILDING MACHINE
Filed Nov. 2, 1950    10 Sheets-Sheet 4

INVENTOR
*Herman T. Kraft*
BY *Evans + McCoy*
ATTORNEYS

Oct. 21, 1952  H. T. KRAFT  2,614,952
TIRE BUILDING MACHINE
Filed Nov. 2, 1950  10 Sheets-Sheet 8

INVENTOR
*Herman T. Kraft*

BY *Evans + McCoy*
ATTORNEYS

Oct. 21, 1952 H. T. KRAFT 2,614,952
TIRE BUILDING MACHINE
Filed Nov. 2, 1950 10 Sheets-Sheet 9

INVENTOR
Herman T. Kraft
BY Evans & McCoy
ATTORNEYS

UNITED STATES PATENT OFFICE 2,614,952

TIRE BUILDING MACHINE

Herman T. Kraft, Akron, Ohio, assignor to The General Tire and Rubber Company, Akron, Ohio, a corporation of Ohio Application November 2, 1950, Serial No. 193,597

33 Claims. (Cl. 154—10)

This invention relates to a method of and apparatus for building pneumatic tires by what is known as the flat band process.

One object of this invention is to provide a tire building machine which is semiautomatic and by which tires of superior quality may be constructed.

Another object is to provide improvements in the tire building method and apparatus heretofore disclosed in copending application Serial No. 112,579, filed August 26, 1949, of Clifford B. Orr.

Another object is to provide a novel means and method of disposing the tire beads accurately upon the fabric layers while they are wrapped around the tire drum.

Another object of this invention is to provide novel means for turning the tire ply fabric over the tire beads.

Still another object of this invention is to provide novel stitching hammer means which thoroughly beat and hammer the tire tread onto the layers of ply fabric.

With the above and other objects in view, the invention may be said to comprise the tire building machine as illustrated in the accompanying drawings hereinafter described and particularly set forth in the appended claims, together with such variations and modifications thereof as will be apparent to one skilled in the art to which this invention pertains.

Reference should be had to the accompanying drawings forming a part of this specification, in which.

The present invention relates to a tire building machine and method. The machine briefly comprises a central tire building drum D which is mounted cantilever fashion on a shaft extending from the machine frame F, the drum being segmented and expanding pneumatically.

Ply material comprising parallel cords or weak weft fabric impregnated with rubber is wrapped around the drum in layers with cords diagonally disposed and oppositely directed in successive layers. Tire beads are located and placed on the end portions of the fabric layers. Fabric lapping means then advances inward from each edge of the drum and turns the edges of the fabric layers over the tire beads. A strip of tire tread is wrapped around the fabric layers and drum, and a multiplicity of hammers H next beat down this tread onto the fabric layers. The assembled carcass is then removed from the drum, expanded or bagged and vulcanized in the usual manner.

*Drum assembly*

The drum D is an expandable drum structure or form mounted on and rotating with drum shaft 1. The drum shaft 1 is hollow and extends cantilever fashion from the machine frame F. It is journaled or rotates from one end in two needle-bearing journals 2 and 3 which in turn are bolted to the machine frame. The drum shaft is rotated by pulley 4 and belt 5 from driving means or clutch 6.

The drum or tire building form is a right cylinder with its axis preferably horizontal and with a diameter in the expanded position at least equal and preferably greater than the tire bead diameter and a width approximately equal to that of a flattened or unmolded tire casing.

The drum structure comprises cylindrical supporting means (Figs. 5 and 12) which are preferably formed by a relatively narrow center spider 7 mounted on the drum shaft and relatively wide drum spiders or cylinders 8 mounted on either side of the center spiders. The center spider 7 has a narrow, circular supporting portion 9 (Fig. 12) with a central circumferential groove or channel 10 therein connected by web or brace to a collar portion 11 mounted or keyed onto the drum shaft. The outer face or supporting portion is Y-shaped in cross-section at the groove as shown.

The drum cylinders or annuli supporting pieces 8 are relatively wide cylindrical structures slidably mounted on the drum shaft. Each cylinder has an outer cylindrical portion or face 12 connecting by ribs or spokes 13 to collar portions 14 on the drum shaft. The collar portion 11 of the center spider is tightly keyed onto the shaft by key 15 and collar portions 11 slide on the shaft and are loosely keyed to the shaft by this key. Thus the drum spiders 8 are slidable on the drum shaft and can be axially adjusted by adjusting means or right and left screw 16 threaded on collar portions 11 as shown and supported by bearing 17 in spider 7. This adjustment varies the drum width to accommodate various widths of ply material and to build different width tires.

The cylindrical portions 12 of the drum cylinders have an inwardly directed flanged portion 18 around the edge furthest from the center spider to which slotted end cylinders or end pieces 19 on either side of the drum cylinders are bolted. The slotted end cylinders have a corresponding flanged portion 20 abutting the flanged portions 18 of the drum cylinders.

Disposed around each drum spider 8 are two pneumatic annuli 21. These annuli are preferably hollow rubber tubes which can be inflated and deflated by pneumatic inflating means or connections 22. Maximum drum expansion is limited by circumferentially flanged portions 23 (Fig. 11) on the end cylinders which check the axially extending garter springs 24 in support portions 25 of the drum end segments 26.

The drum surface is formed by a multiplicity of narrow segments such as end segments 26 disposed over annuli 21 and center or spanning segments 27 disposed across the central portions of the drum and overlapping end segments 26.

The center segments 27 (Figs. 5 and 12) are characterized by a central bend 28 which forms a groove or channel around the drum circumference. A resilient constraining means or rubber band 29 is placed in this groove and serves to keep the segments aligned and in order. The rubber band 29 is in tension when placed in the groove formed by these segments and the tension is increased when the drum expands. When the annuli are deflated and the drum is contracted, tensile forces in the rubber band draw the center segments back onto the spider. The V bend in the segments fits into the circumferential groove 10 in the center spider so that with the rubber band the segments are constantly being centered and located as the drum is expanded and contracted. The interfitting of the center bend in the segments with the circumferential groove in the spider also constrains the segments against axial shifting.

Disposed over the annuli on the drum cylinders 8 are the flanged or end segments 26. These segments are characterized by end flanges 30 and 31 which fit over the drum ends and project radially inward therefrom. Flanges 31 are adjacent the central spider and flanges 30 are adjacent the end cylinder. At the innermost position on said flanges are supports or rests 25 and 32 for supporting the constraining means or garter springs 24. The garter springs continuously draw in on the segments to align them and keep them in order throughout the expansion and contraction cycle.

Figures 5, 6, 7:
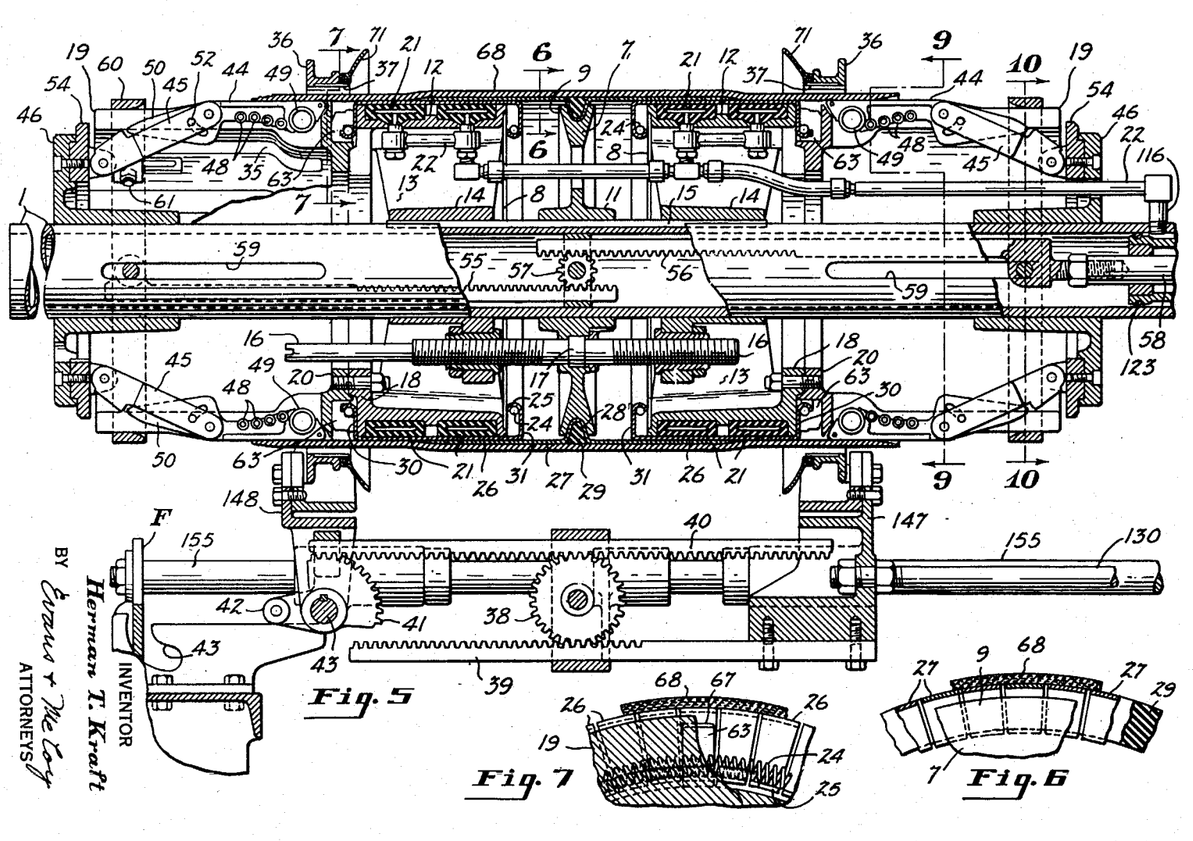
Fig. 5 is a cross-section of the drum with the cord plies wrapped around it prior to expansion and with the bead placing rings in position with the tire beads thereon.
Fig. 6 is an end detail cross-section with parts broken away taken along line 6—6 of Fig. 5 through the center of the drum showing the drum construction with the circumferential groove and rubber ring therein.
Fig. 7 is a cross-sectional detail with parts broken away taken along line 7—7 of Fig. 5 of one of the center lugs which are welded to drum channel segments and which expand out with the channel segments when the drum inflates and press against the tire bead to hold and position it. This detail shows an end view of the center lug as positioned prior to expansion.

The flanged segments and center segments are preferably arranged closely together or abutting around the drum so that when the drum is expanded the maximum circumferential surface is presented. Fig. 6 illustrates this arrangement. This figure shows the drum in the contracted position and for this reason the separate segments in each layer nearly abut each other. Naturally in the expanded position the gaps are wider.

Figures 12, 13:
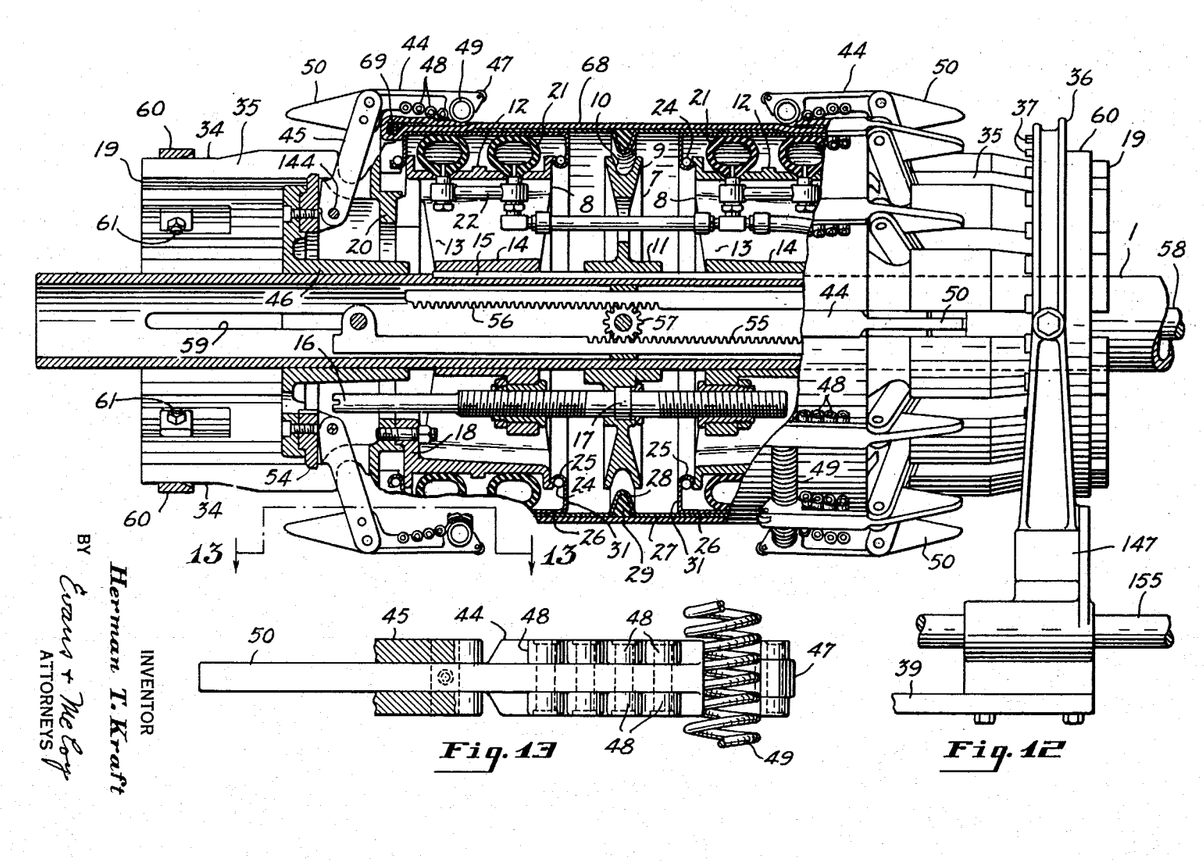
Fig. 12 is a front elevation of the drum with parts broken away, showing the drum in the expanded position and the turnover fingers in their most inward or advanced position.
Fig. 13 is a top elevation view taken on line 13—13 of Fig. 12 of a turnover finger.

Bolted or otherwise attached to the drum cylinders 8 are drum end pieces 19. These end pieces are cylindrical members with a reduced or tapered end portion 34 (Fig. 12). Disposed around the cylinder face are a plurality of slots or cuts similar to cuts 35 (Fig. 10) each slot accommodating a turnover finger. As described, the inner edge or face of each of these end pieces or slotted cylindrical members has a flange or inner extension 20 to which the drum cylinders bolt.

Bead placing means

The bead placing means disposes or places the tire beads over the end portions of the tire fabric and axially out from and adjacent the drum shoulders.

The bead placing means (Fig. 3) comprises bead rings 36 with a relatively thin flanged portion or bead supporting means projecting inwardly or toward the center of the drum. These flanged portions or flanges are preferably parallel to the central axis or axial with the tire drum. The supporting means disclosed in the accompanying drawings features a multiplicity of resilient fingers or teeth 37 disposed circumferentially about the face of the annular ring and projecting inwardly and axially therefrom. The fingers are preferably resilient so that they can receive beads of slightly different diameter and thus not require close bead tolerances. The axial length of the fingers is preferably less than that of the beads so that when the beads rest upon them, portions of the beads will project out and beyond the fingers. Thus the beads will contact fabric on initial expansion of the drum while also being positively positioned by the bead placing means. Needless to say, since the tire beads are actually steel or wire rings, they are relatively inexpansible.

Figure 2:
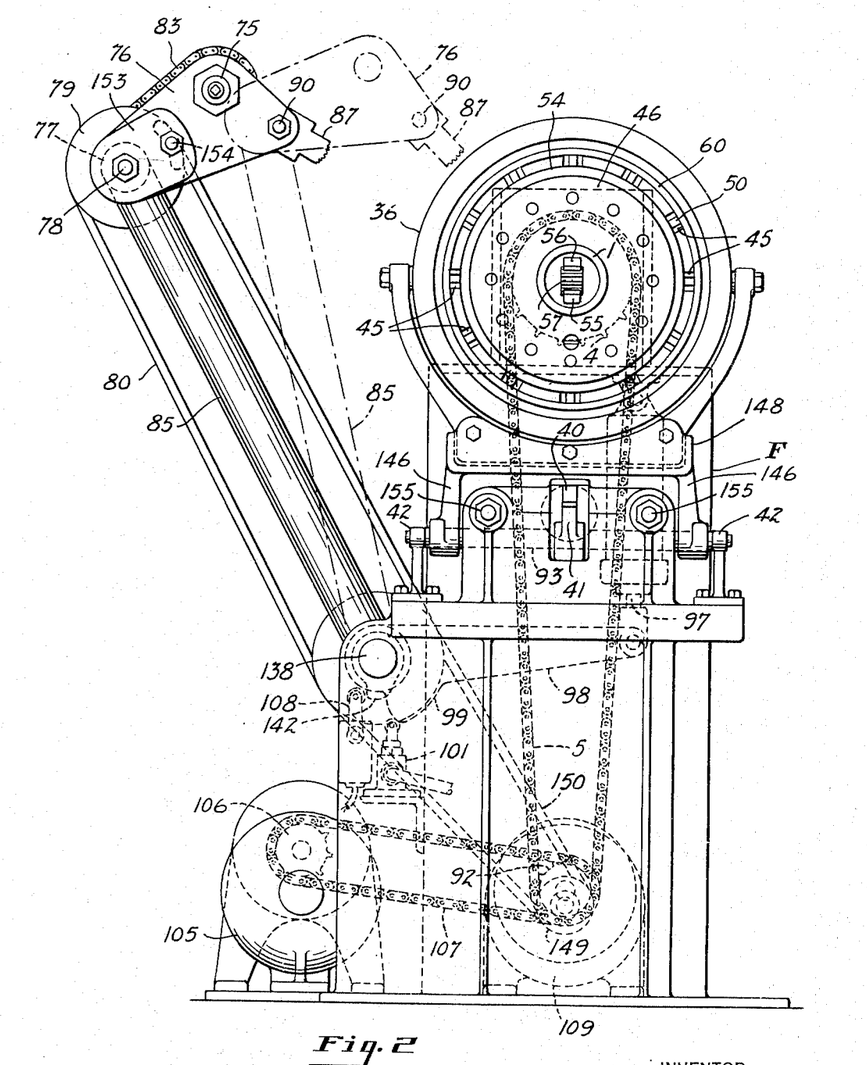
Fig. 2 is left side elevation of the tire building machine showing the stitching hammers in the retracted and operative positions, and the location of other machine parts.
Figures 3, 4:
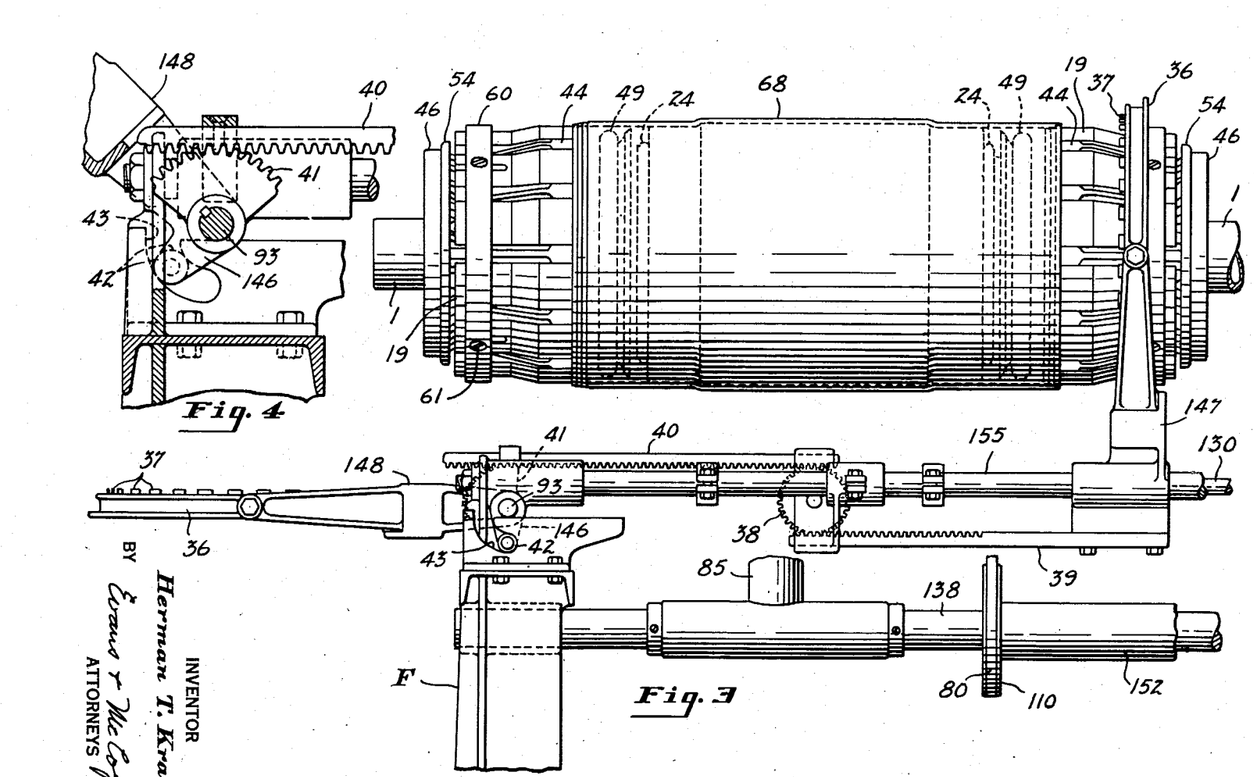
Fig. 3 is a front elevation view of the drum, bead placing rings, and the rack and pinion mechanism for advancing and retracting the bead placing rings.
Fig. 4 is a detailed enlargement of the gear segment and cam mechanism for turning down the outside or left-hand bead placing ring.

The bead rings are moved and positioned over the fabric ends by pinion 38 and bead racks 39 and 40 (Fig. 3). The inner or right-hand ring frame 147 is attached directly to rack 39 and moves in and out with it. This ring is centered in relation to the drum so as to fit over the end portion of it without difficulty. The outer or left hand bead ring frame 148 has two spaced integral arms 146 to which cam followers 42 are attached. This frame 148 is keyed to ring shaft 93 as shown. Also keyed to the ring shaft and intermediate the spaced arms 146 is gear segment 41 which engages rack 40. Cam follower 42 fits in arcuate slot or cam 43 so that when the rod is moved outward and the cam follower reaches its slot, the ring is pivoted and dropped down horizontally. In turn, as the rod is moved inward the cam raises the ring back to a vertical position at right angles to the major drum axis. The bead rings are pivoted in their frames or supports 147 and 148. The bead ring frames move back and forth on guide bars or rods 155 (Fig. 2) and are located and supported thereby.

Fabric lapping means

Another novel feature of the present invention is the fabric lapping means located at each end of the drum for turning over or lapping fabric layers around the tire beads. The lapping means (Fig. 12) comprises a multiplicity of fingers or folders 44 pivotally attached to a multiplicity of corresponding links 45 which are in turn pivotally attached to a sliding collar or axially movable support 46. The fingers are evenly disposed around the circumference of the slotted end cylinders with a finger corresponding with each slot in the end cylinders.

Figures 16, 17, 18, 18A:
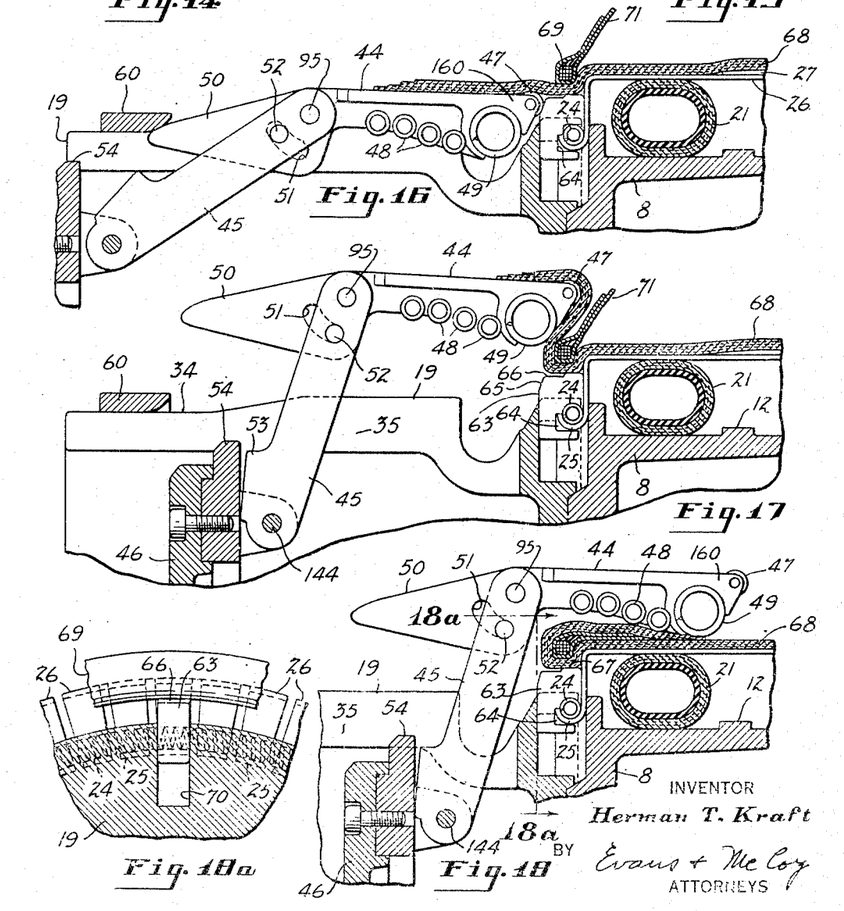
Fig. 16 is a cross-sectional detail of the turnover finger and end portions of the fabric layers as the finger commences to move inward and over the bead in the turnover operation.
Fig. 17 is the same as Fig. 16 showing the finger further advanced and one-half way through the turnover operation.
Fig. 18 is the same as Fig. 16, showing the finger completely advanced and completing the turnover operation.
Fig. 18a is a cross-sectional view taken along line 18a—18a of Fig. 18 showing an end view of the centering lug.
Figure 19:
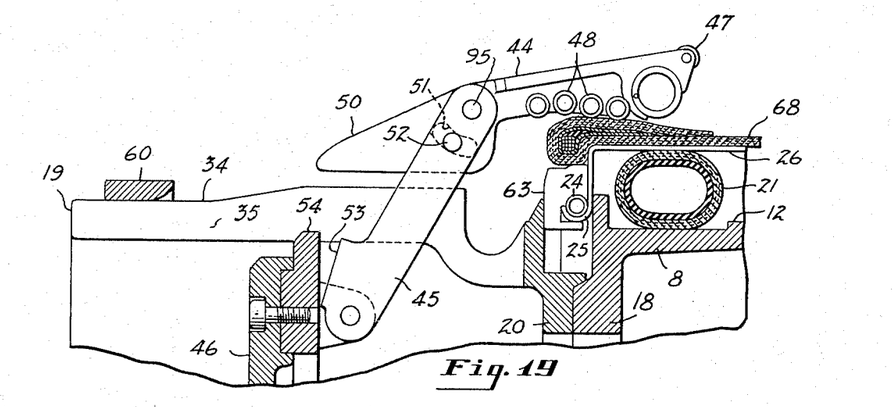
Fig. 19 is the same as Fig. 16, showing the finger as it is retracted.

A turnover finger or folder is shown in more detail in Fig. 17. It is understood that similar fingers are disposed at equally spaced intervals around the circumferences of the end pieces 19. Each finger 44 has a small front or nose roller 47 on the nose portion and a series of rollers 48 along the inside or bottom portion. The rollers are located on the fingers so that their fabric contacting faces, in cooperation with the resilient annular constraining means 49 generate a transversely curved circular surface of somewhat ogee shape. As will later appear, the convex portion of the curve as presented to the tire fabric and bead is defined in part by the resilient annuli.

The nose portion or extension 160 of each finger extends axially centerward beyond the annular spring 49 and engages or prys into the fabric end portions in the lapping operation. It is beveled or rounded as shown and preferably has a nose portion 47 therein. If desired, the nose portion may have a thin extension or bill extending axially centerward beyond the nose roller to pry into the fabric ends and prevent them from doubling over.

The fingers or folders 44 of the fabric lapping means may be of varying lengths depending upon the width of the fabric ends which are to be turned over.

Fingers extending substantially across the drum to the opposite bead for sequential operation or for lesser travel, can be utilized in connection with the present invention. In such a case, the drum end cylinders and related parts are extended and elongated correspondingly to accommodate the fingers.

The back portion or remote end of the finger preferably has a bulbous triangular extension 50 as shown. In the line between the finger pivot 95 and collar pivot 144, the finger extension is formed with a small arcuate slot 51 which receives a stop pin 52 which is in turn attached onto the link 45. In this way a lost motion connection between the link and finger piece is achieved. The slot and pin limit the pivotal arc of the finger piece and give the link or pusher piece a positive check with which to push the finger forward. Figs. 17 and 18 show the finger piece with the stop pin in the maximum forward horizontal position as the assembly is pushed forward.

The links or pusher pieces are short metal pieces with pivots at either end. A check rod or rivet 52 on the link is located toward the finger pivot 95 and as noted this fits into arcuate slot 51. An ear or lug portion 53 is formed on the link near the collar pivot and this engages the flange 54 of sliding collar 46 to act as a positive check or safety check so that a rigid structure is formed as the assembly is pushed forward.

The flanged collar or sliding collars 46 (Fig. 12) at both ends of the drum assembly are cylindrical collars or sleeves with flanges or flanged portions 54 and are in turn bolted to finger racks 55 and 56 which extend through the hollow center of the drum shaft and engage finger pinion 57. The rack 55 nearest the motors and controls is screwably attached to a rod 58 (Fig. 8) which extends the length of the hollow shaft and moves the racks in and out. The drum shaft itself has longitudinal slots 59 in it to provide for clearance of the bolt attaching to collars 46 and racks 55 and 56.

Figures 8, 9, 10, 11:
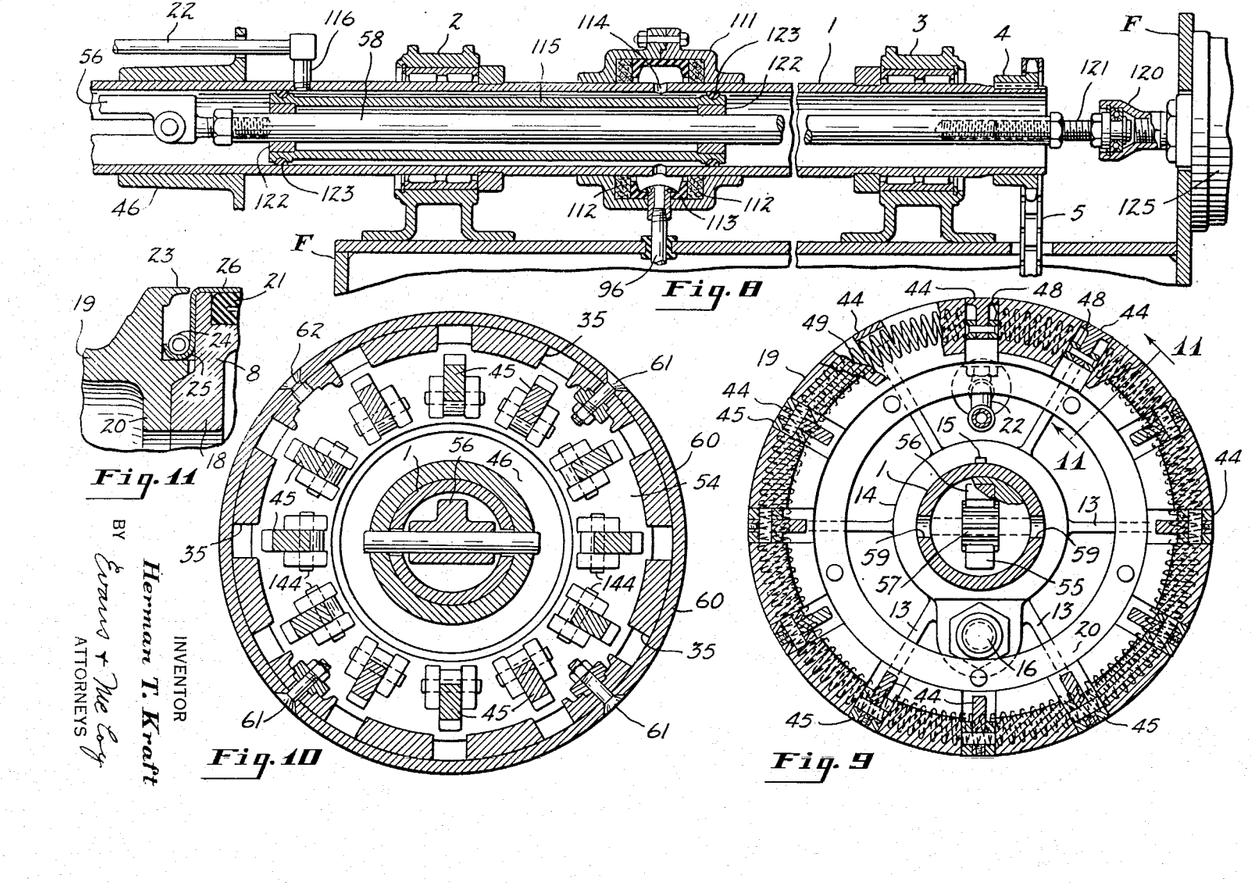
Fig. 8 is a cross-sectional detail of the pneumatic connections through the drum shaft for inflating the drum.
Fig. 9 is an end view of the drum, with a small portion broken away, taken along line 9—9 of Fig. 5. It shows the disposition of the turnover fingers and garter spring.
Fig. 10 is a sectional end view of the drum taken along line 10—10 of Fig. 5 through the finger check ring.
Fig. 11 is a cross-sectional detail taken on line 11—11 of Fig. 9 showing the flange or overhang on the slotted end cylinders for checking drum expansion.

The arrangement and disposition of the links and finger pieces about the drum circumference is well illustrated in Figs. 9 and 10. Twelve folders and links are shown, although any suitable number may be used. Fig. 9 also shows the large resilient constraining means or garter spring 49 through the noses of the fingers to draw them down upon the drum. Each finger fits in a slot as shown.

Fig. 10 shows the position of retaining or check ring 60 on the slotted end cylinders. This ring fits over the tapered outer end portion of the slotted cylinder and checks the rear or tail of the finger as it initially moves forward over the fabric layers. This action is illustrated in Fig. 16. The ring can be adjusted forward or backward to give correct action to the assembly. Adjustment is made through the ring adjusting bolts 61 (Fig. 10) which fit in holes 62 and draw up against the slotted cylinder.

Bead centering means

Functioning and operating with the bead placing means is the bead centering means for expanding the fabric radially outward against the inner circumferential surface of the tire beads and for positively centering the beads in coaxial relation to the drum and to the ply material comprising the tire band. The centering means comprises a series of blocks or centering lugs evenly disposed around the drum shoulders and provided with means for expanding radially outward against the inner circumferential surface of the tire bead. Figs. 14-19 show one of these blocks or centering lugs.

Each centering lug 63 is a relatively narrow piece with a rectangular shape. The inner corner adjacent the drum cylinder has a notch or cutaway portion 64 therein to accommodate the turned over edge or support 25 of the channel segment 26. The garter spring 24 rests in the support as shown. The outer corner adjacent the end cylinder has a bevel or slant 65 to provide a ramp or portion upon which the nose roller of the finger piece can ride.

The outside edge or fabric engaging face of each centering means preferably has an axial cutaway portion or relief 66 on the side adjacent the end cylinder. These reliefs prevent pinching of the bead supporting fingers between the centering lugs and the beads. Accordingly the reliefs are coextensive in axial length with the fingers. This relief also eliminates excessive pressure or minimizes pressure on the fingers so that the ring can be more easily withdrawn after the bead is in position. The risers or pressure applying portions 67 extend radially outward from the lugs and engage and expand the fabric against the beads.

The centering lugs or blocks are relatively narrow circumferentially and are disposed around the drum so that one is aligned with each finger in the end cylinder. The lugs may be bolted or welded to the flange 30 (Fig. 14) of the end segments over the drum shoulders so as to expand with the drum. In this way the drum itself provides the means for expanding the blocks radially outward. Alternate means for expanding the blocks radially outward such as a separate pneumatic annulus may also be used.

Figure 14:
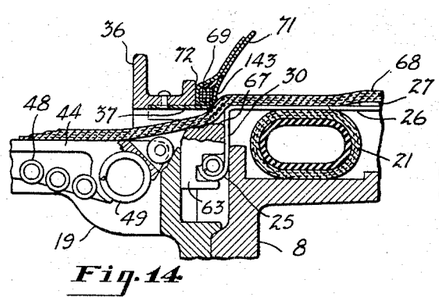
Fig. 14 is an enlarged cross-sectional view of the bead placing ring, turnover fingers, center lug and drum. This detail shows the drum partially expanded.
Figure 15:
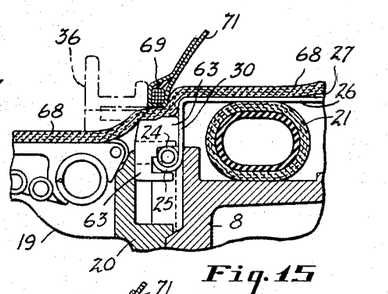
Fig. 15 is an enlarged cross-sectional view similar to that of Fig. 14 showing the drum completely expanded.

When the centering lugs are expanded radially outward against the fabric ends, the extensions or risers press against localized areas of the ply material 68 embraced by the bead rings. (Figs. 14 and 15). Since each lug preferably has an insert or relief for the fingers, the outward pressing or expanding forces applied to the fabric by the lugs are directed radially of the risers on the lugs adjacent the drum or cylinder shoulders. Thus the portions of fabric ends axially central of the bead supporting finger ends are firmly pressed and wiped against the overhanging portions of the tire beads 69.

The centering lugs are relatively narrow as shown in Fig. 18a and move in slot 70 in the slotted cylinder or drum end piece. As noted, the centering lugs are evenly disposed around the slotted cylinder corresponding with the fingers so that there is one in axial alignment with each finger.

The method of placing and disposing the tire beads on the fabric ends is now evident. The tire bead 69 with its fabric wrapping and flipper 71 is placed over the resilient fingers or teeth 37 and against the face 72 of the bead ring. Fabric layers or plys are wrapped around the drum. Since both the bead wrapping and fabric layers are impregnated with a tacky rubber compound, they readily stick together.

The bead rings are then brought forward or advanced over the end portions or axially outside of and adjacent the drum shoulders and the drum is expanded. As the drum is expanded the centering lugs push out on the fabric layers. This in turn presses the fabric against those portions of the bead concentric of the centering lugs. At the same time, the face of the ring steadies and restrains the bead to prevent it from going off center or being cocked. The bead itself cannot expand appreciably because it is actually a ring of steel wire. The bead placing ring is finally withdrawn to leave the bead accurately and positively positioned on the fabric ends (Fig. 15).

Tread stitching means

Another feature of this machine is the tread stitching means or hammer mechanism H which stitches or kneads the tire tread onto the fabric layers. This operation commences after the beads have been accurately placed upon the fabric end portions and the fabric end portions wrapped or rolled over said beads by the turnover fingers. A tire tread or camelback of extruded, uncured rubber with a cross-sectional shape similar to that of a finished tread is then wrapped around the fabric on the drum and beat down and smoothed out over the fabric layers by the tread stitching means.

The tread stitching means or hammer mechanism (Figs. 22, 23 and 24) comprises a multiplicity of beating members 73 journaled on a series of cams 74 which in turn are keyed or otherwise attached to cam shaft 75. This shaft is mounted between mounting plates or supporting plates 76 secured to frame plates 153 rigidly mounted on shaft 78 and tubular frame member 77. Bolts 154 provide for adjustment of plates 76 with frame plates 153 to locate suitably the hammer head with the tire building drum. The cross brace 77 can be a hollow pipe as shown. The shaft actuating means comprises a pulley 79 rotating around the long bolt as a shaft and integrally keyed to the same bearing sleeve 81 as pulley 79 and rotating with said pulley is sprocket 82. A chain belt 83 connects sprocket 82 with sprocket 84 keyed to the cam shaft and thus drives the cam shaft. The whole mechanism is brought into functioning relation with the tread by hammer positioning arm or support 85 (Fig. 2). This arm is bolted or welded to the cross-brace 77.

The beating members 73 comprise a hammer body 86 and a hammer or head 87. The hammer is preferably spring mounted on the body by springs 88 screwably tightened by bolts onto the body. The spring mounting on the head is preferably adjusted so that only the hardest blows permit the springs to give and allow the head to move away from the work. The hammer body and head form a slot 89 in which guide means or rod 90 fits. This rod is mounted between end plates or mounting plates as shown.

The hammer body is journaled to cam 74 rotating on cam shaft 75. The cam on each individual hammer is offset from the adjacent one and the row or series is set or arranged so that a wave of separate hammer blows flow out from the center towards the ends of the stitching means. Each hammer body is of the same dimension over that portion which is journaled on the cams and the portion that includes the slots 89. That portion of the hammer body that extends beyond the slots is of such length that if all of the hammers were mounted on a cylinder of the same diameter as the cams, then the hammer heads would align themselves substantially to the contour of the tread that is being applied. This insures substantially the same blow from each hammer head so that every part of the tread will receive substantially the same compacting pressure from the action of the hammers. By increasing the length of some of the hammers relative to the others, the degree or intensity of the hammering action of such lengthened hammers is increased. This arrangement may be used to compact and bond the relatively thick central portions of the tread against the underlying ply material of the tire band.

The timing of the cams is preferably such that only one hammer on each side of the centerline is in contact with the tread at one time, but in each case, the adjacent outward hammer is about to make contact as the inner hammer hits. Thus the hammers strike the tread in a sequential wave motion from the center outward.

Figures 22, 23, 24:
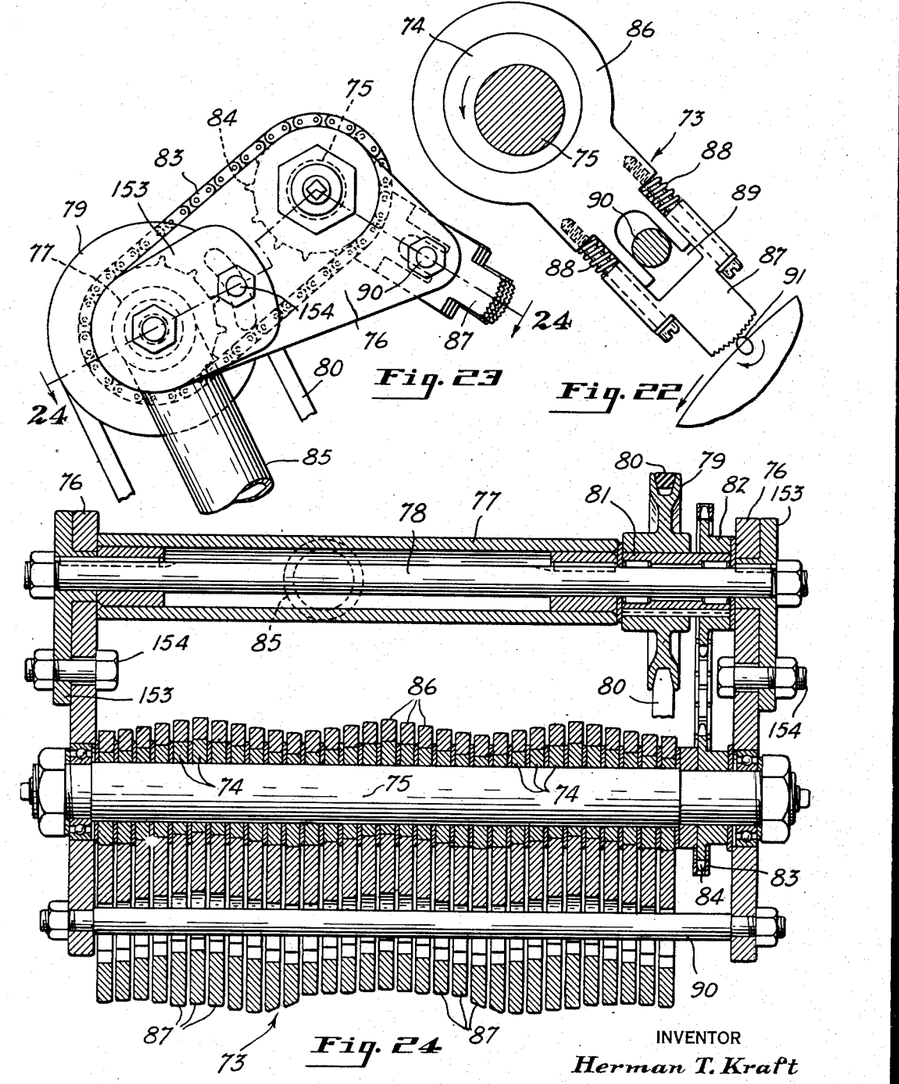
Fig. 22 is a detail view of a hammer and how it strikes the camelback on the drum.
Fig. 23 is a side elevation of the stitching hammer positioning arms and hammer driving chains.
Fig. 24 is a cross-sectional plan view of the stitching hammers, cam shaft, and plates and positioning arm.

The hammer action is such that the hammer moves in and out as directed by the cam and pivots slightly on the guide rod to strike the tread along a line through the drum axis and then pulls forward on the drum. The hammer has a walking motion which rotates the drum but does not objectionably stretch the tread. Thus the locus of the point of contact on the tread or its patch is an oval or ellipse. This path 91 is shown in Fig. 22. Throughout the hammering or stitching operation, the hammers rotate and feed the drum at a suitable relatively slow speed. Thus the hammers beat and stitch progressively around the tread face. The tread or camelback is not stretched because the motive force for rotating the drum comes from the walking action of the hammer members, which have serrations on their contact faces so that they can readily feed the tread forward and impose a rotating motion to the drum during the tread applying cycle.

Controls

Figure 1:
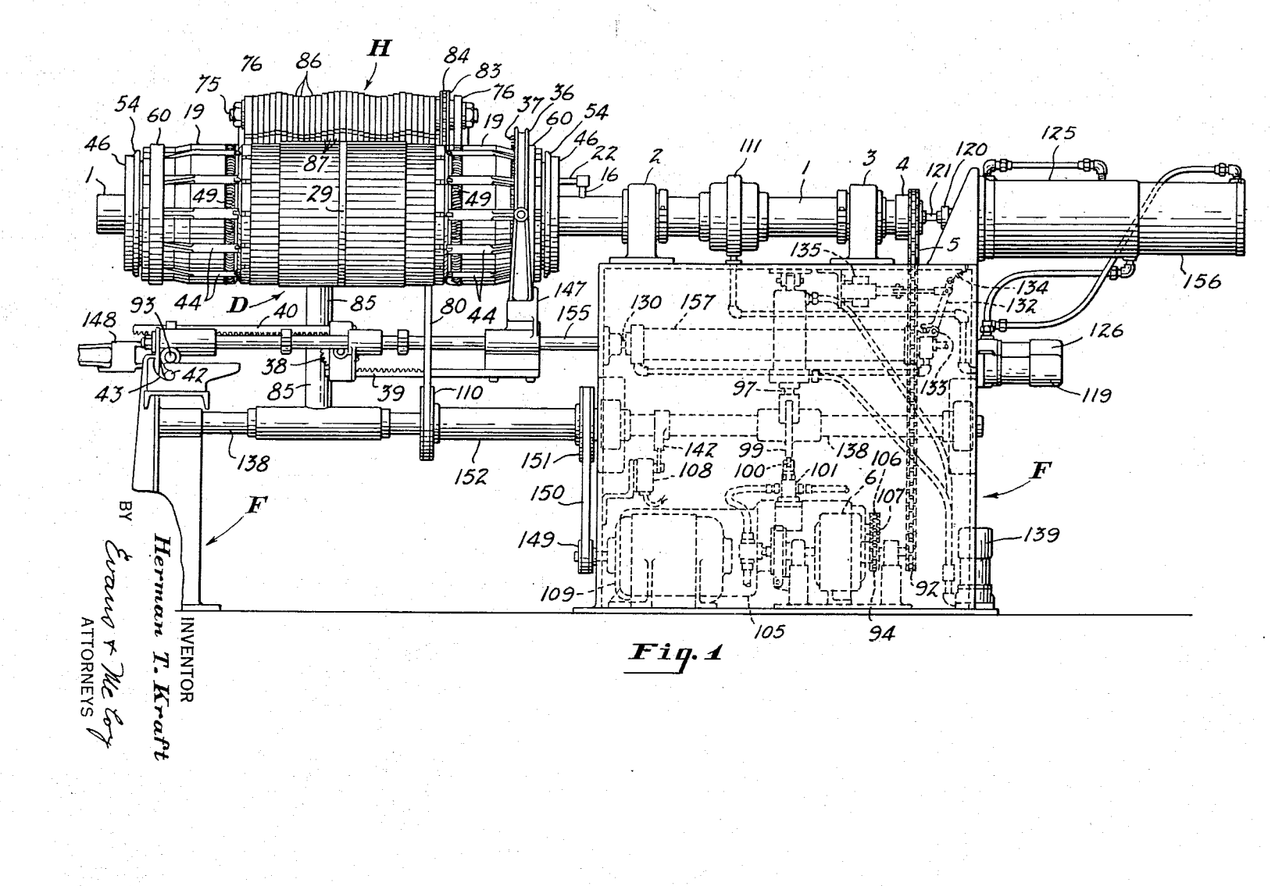
Figure 1 is a front elevational view of the machine showing the tire building drum, tread stitching hammers, fabric turnover fingers, and related operating machinery and controls.
Figure 25:
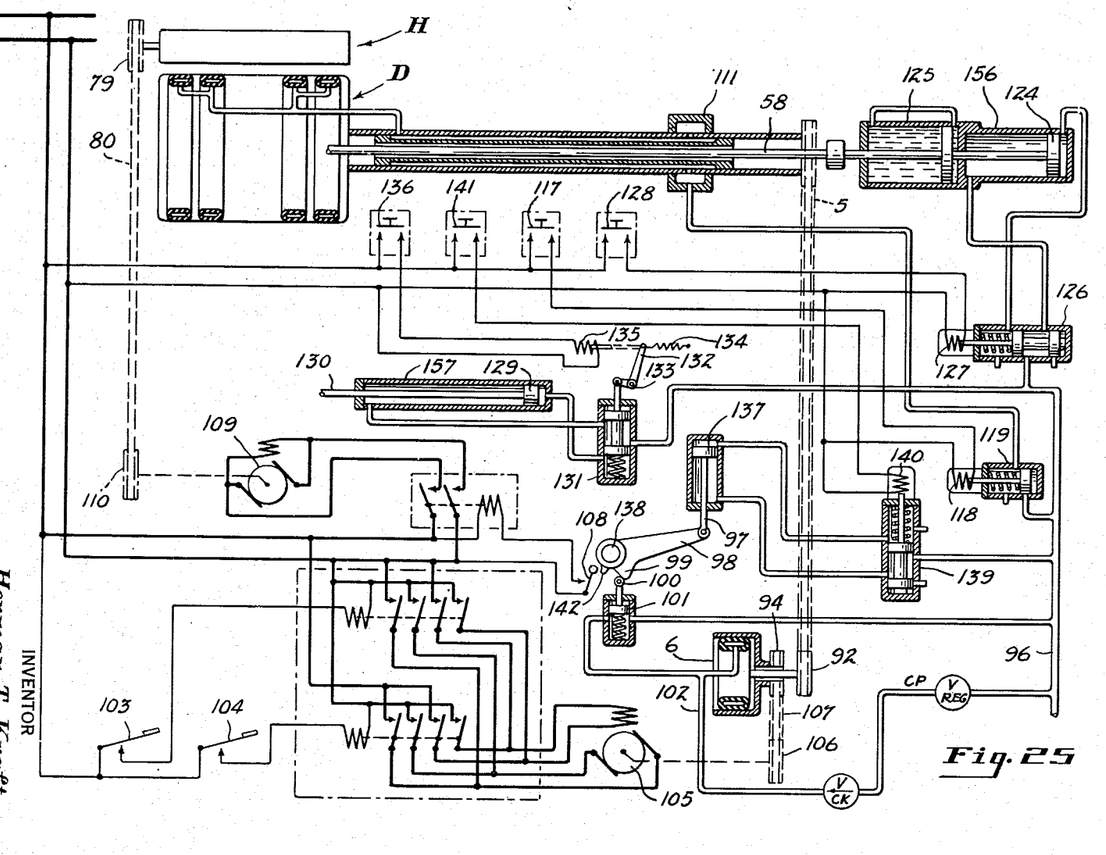
Fig. 25 is a schematic diagram of the control system of this invention. It shows the solenoid switches, air valves, and electrical switches and connections.

The operating mechanisms for this machine are relatively simple. The drum shaft is rotated from pulley wheel 4 (Fig. 1) which is run by belt or chain 5 off of sprocket 92. Sprocket 92 is in turn run from clutch 6. The clutch 6 itself is an air clutch and is best shown in Fig. 25.

The clutch 6 is normally supplied with one hundred pounds of air pressure from line 96. However, when the hammer mechanism is brought into position by a downward thrust from piston rod 97 pivoted on the hammer arm lever 98, a cam 99 presses roller 100 and pushes shut-off valve or stop piston 101 over the high pressure air line to shut it off. This leaves only the low pressure line 102 supplying the clutch to give the so-called "slip drive." A slip drive is a drive in which the clutch only delivers enough power to barely rotate the drum, and any drag upon the drum cannot be overcome and will stop it. The drum rotation is controlled by foot pedals 103 and 104 (Fig. 23). One pedal is for forward or clockwise rotation and the other is for reverse or counter-clockwise rotation. The clutch is driven by electric motor 105 from sprocket 106 to clutch sprocket 94 by chain 107.

At the same time as the hammer arm lever 98 is pressing shut stop piston 101, it is closing switch 108 which starts electric motor 109 (Fig. 2) which by a pulley 149 (Fig. 1) and belt 150 runs pulley 151 on sleeve 152. Sleeve 152 rotates on shaft 138 and pulleys 151 and 110 are both keyed or otherwise attached to the sleeve. Thus pulley 151 rotates pulley 110 which by belt 80 in turn rotates the pulley 79 and drives the hammer mechanism as already described.

The drum is inflated pneumatically. The air supply comes in through gland 111 (Fig. 8) on the drum shaft. The gland is stationary and has rings 112 surrounded by packing 113 so that it forms a tight seal with the shaft. The air enters from the supply line 96 through openings 114 in the shaft and then passes down the space between the inside of the drum shaft and the outside of the finger actuating rod sealing cylinder 115. The air pressure is taken off at tap 116 and is delivered to the individual pneumatic annuli as shown in Fig. 5. The drum is inflated from hand switch 117 (Fig. 25) which in turn energizes solenoid 118 to open air valve 119. Air valve 119 supplies line air pressure to the pneumatic annuli.

As previously explained, the fingers or folders are moved inward over the fabric ends by the sliding collars 46 which are in turn linked with the finger racks 55 and 56. The right finger rack 56 is moved or actuated in and out by rack rod or collar actuating rod 58 (Fig. 8). This rod extends down the center of the drum shaft to swivel connection 120. Bolt 121 coming from this connection screws or engages threads in the rod itself and is adjustable so that the length of the rod can be varied. Adjustment is necessary every time the drum width is varied by moving the drum cylinders in or out so that the fingers in the retracted position rest on the beveled flange of the slotted end cylinders. The rod passes through collars 122 on the inner shaft or rod sealing cylinder 115 with rubber O-ring seals 123 around the cylinder to prevent air leakage into the drum shaft hollow.

The finger rod is actuated or moved in and out by an air piston 124 in cylinder 156 (Fig. 25) on the high pressure air line 96. Because air pressure alone gives too jerky and accelerated a push, an oil filled dashpot 125 is attached to the finger rod. This dashpot gives a smoother and more even motion and eliminates unnecessary slamming and the like. The finger rod air piston 124 is supplied with air pressure through valve 126 which is controlled by solenoid 127 controlled or energized by switch 128. Thus to move the finger pieces in the operation of this machine the operator only needs to close finger rod switch 128.

The bead positioning rings are activated by another similar air piston 129 in cylinder 157 connecting to the rings through rod 130 (Figs. 3 and 26). This piston is controlled by air valve 131 which is normally in the closed position. Bell crank arm 132 pivoted at pivot 133 is kept up by spring 134 so that only when solenoid valve 135 is energized or functions does the arm move downward and apply pressure to the front face of piston 129 and bring the bead rings into position. Bead rack switch 136 controls solenoid 135 and when this switch is closed the bead positioning rings move upon the drum as described.

The tread stitching means or hammer mechanism is brought from its retracted or inactive position (Fig. 2) to the tread stitching position (Fig. 2 phantom outline) by piston rod 97 of piston 137 (Figs. 2 and 25), which pushes down on hammer arm 98. This arm pivots about shaft 138 and is bolted or welded to hammer support 85 to form a bell crank arrangement. The support is in turn bolted or welded to cross brace 77 and supports the whole mechanism.

Piston 137 is controlled by air valve 139 which is a three way valve supplying air pressure. Solenoid 140 controls the valve and is in turn operated from hand switch 141. Thus to raise the hammer mechanism into position the operator throws hand switch 141.

As the hammer arm 98 is moving up into stitching position, the cam or lug 142 throws switch 108 which in turn starts the electric motor driving the stitching means. This operation thus automatically begins when the hammer arm is lowered and a separate switch for the stitching means is not necessary.

Operation

Operation of the machine is as follows:

The layers or piles of rubberized tire fabric are wrapped or placed around the drum with bias cuts in each layer opposed or crossing at around a right angle. That is, the warp cords in each layer make an angle with the cords in the adjacent layers. The fabric usually consists of cotton, rayon, or nylon cords impregnated with rubber compound so that it is sticky or tacky and each layer sticks readily to the adjacent one.

By expanding the drum after the fabric layers have been located thereon, the fabric layers are stretched and wiped or forced together to eliminate any bumps, ridges, or air pockets. The expansion operation thus binds and wipes together the fabric layers.

The plies or fabric layers may be of the same width. To give feathered or tapered edges, each layer is horizontally offset or staggered in relation to those adjacent. This is shown in Fig. 5. The stagger or offset is usually from one-fourth to one-half inch. Each ply can be offset in or out or alternately. Another method of achieving a feathered edge is to use plies of decreasing widths with the widest on the inside and the outer ones progressively narrower. Four or six plies are usually used in a tire casing. The fabric ends or end portions project over the edge of the drum as shown in Figs. 5, 14 and 15 about three to six inches. Some projection or overhang is necessary to give enough fabric to wrap around the tire bead. The fabric layers are usually wrapped or disposed around the drum by hand from fabric rolls and cut off to length.

After the fabric layers have been placed around the drum, the beads must be placed on the fabric end portions. The beads are set on the bead rings at the beginning of the tire building operation. That is, when the outer or left-hand bead ring is in the axial or horizontal position and when the inner or right-hand ring is vertical and retracted (Fig. 3) the beads are placed upon them. The beads should fit the rings snugly, but since the ring fingers are resilient and springlike they will give slightly to accommodate small variations in bead size.

To bring the beads and bead rings up into position over the fabric ends, the operator throws hand switch 136 which causes air piston 129 to move forward or toward the drum and bring one ring forward and the other ring up over the fabric ends (Fig. 5). This leaves the beads resting on the resilient fingers over the fabric end portions.

In the next step the drum is expanded by inflation of the annuli. As it expands, the centering lugs expand radially outward against the fabric layers and tend to pin or press portions of them against the inner bead circumference. In other words, the risers of the centering lugs enter into simultaneous firm engagement with the fabric concentrically interior of the beads and evenly about their inner circumference so as to pinch or squeeze portions of fabric radially exterior of the centering lug risers between the risers and the inner circumference of the tire beads. Portions of the fabric also wipe up against the inner sides 143 of the bead rings. This unites circumferential portions of the beads with the fabric and firmly positions them so that the bead ring can be withdrawn. Fig. 15 shows this position with the bead ring in dot and dash outline. Throughout this bead placing operation the face 72 of the bead rings pushes in upon the beads and prevents them from becoming cocked or otherwise off center. The bead rings are then withdrawn and the beads are each left sticking firmly to a radially disposed portion of the fabric layers.

After the beads have been placed on the fabric, the feathered fabric edges must be turned or rolled over the beads. This is accomplished by the novel turnover folders or fingers previously described. The sliding collars or finger actuating pieces 46 move forward and cause the links 45 to give a forward and outward push to the fingers. At the initial portion of this stroke, each finger is raised outward until its tail or end 50 is checked by the check ring or finger restraining ring 60 (see Fig. 16). The finger then moves forward out from under this ring and is raised still further out from the drum. (See Fig. 17.) The finger nose is initially raised outward as it slides over the beveled face, or ramp of the centering lug, and then it is further lifted by the link. Concurrent with this action the slot rivet is bearing on the central end of the finger slot to give a rigid connection between the link and finger to effect this motion. All of this time the large garter spring through the nose position of the finger is pulling down and inward on the finger nose so that the resultant force is sufficient to keep the finger nose down and rolling over the ply layers. The finger nose or front has an inwardly beveled face as shown so that forward horizontal forces from the collar and link result in radial outward climbing motion. Fig. 18 shows the maximum forward position of the finger in the turnover operation. It should be noted that the garter spring is strong enough to keep pulling down on the nose and to give the assembly pushing-rigidity so that the link does not necessarily pivot on its pivot 144 until its boss 53 abuts the face of the flange 54 of finger push collar 46. In other words, the link does not have to pivot until the link boss abuts collar face to give the assembly sufficient pushing-rigidity. In some instances, however, the boss will abut the collar face. Thus the boss serves as a positive check to insure rigidity of the linkage throughout the forward stroke. Throughout the turnover step, this garter spring also presses radially inward upon and stitches down the fabric edges as they are rolled or turned over. Since each of the fingers are disposed concentrically and evenly about the circumference of the end cylinders and all of the fingers on each cylinder are moved from a single sliding collar and connected by similar linkage and have a common garter spring through their noses, the fingers on each end cylinder move together and generally cooperate throughout the lapping operation. The garter spring connecting through portions of the fingers turns over or laps those portions of the fabric ends intermediate the fingers themselves.

The next operation in building the tire carcass is to wrap the tire tread or camelback over the ply layers. The camelback is cut to length and wrapped around the drum by conventional means. The operator then presses switch 141 which brings the hammers up into position, throws the drum into slip drive, and starts the electric motor driving the hammer shaft. The hammers beat or stitch the tread onto the plies. Each hammer engages and strikes the camelback in a walking motion which presses down upon the camelback and pulls it forward. The locus of the center point on the hammer is thus an oval or ellipse 91, as shown in Fig. 22. At the same time, the row of hammers strike in a relatively rapid undulating wave motion progressing outward from the center hammers. This thoroughly beats or stitches the camelback onto the fabric layers. Each hammer is spring mounted for resilient yielding action so that when a bulky or bumpy portion of the camelback is encountered, the individual hammer will yield and not dig into it. The drum is turned one or more times in this stitching operation.

Figure 20:
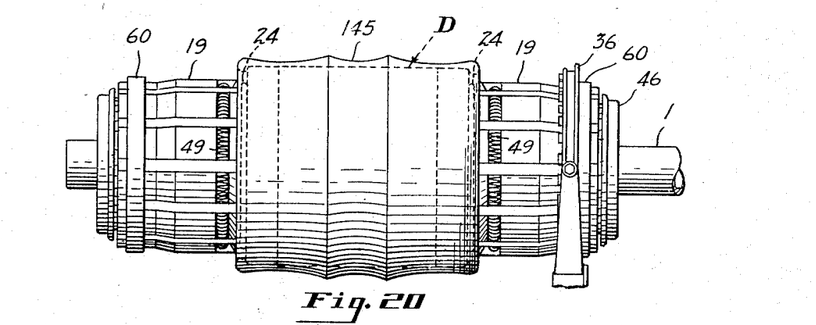
Fig. 20 is a side elevation of the drum with parts broken away to show it in the expanded position with a completed carcass or casing thereon.
Figure 21:
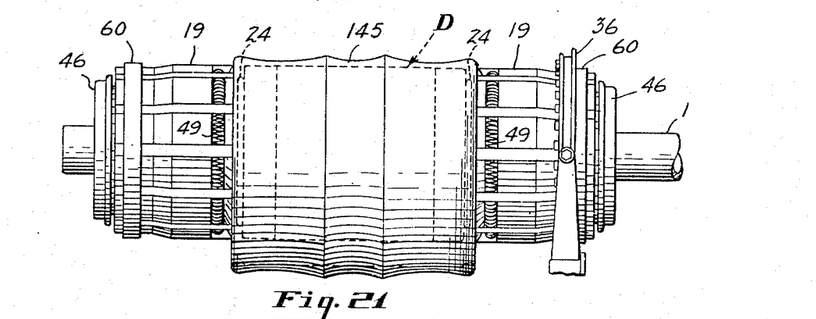
Fig. 21 is a side elevation of the deflated drum with the assembled casing hanging thereon prior to being removed.

When the tread stitching operation has been completed, the drum is deflated. This leaves the assembled casing 145 on the drum (Fig. 21) ready to be lifted off and sent on to be further expanded and vulcanized. Fig. 20 shows the stitching operation completed with the drum still inflated and Fig. 21 shows the drum deflated with the casing loosely hanging on it. The cycle is then repeated on another tire.

It is to be understood that the machine shown herein in detail may be varied considerably without departing from the scope of invention herein shown and described.

What I claim is:

1. The method of building a pneumatic tire comprising disposing a plurality of fabric layers over a drum, disposing the tire beads over the fabric end portions on bead placing means, expanding the drum and integral clamping means out against the fabric end portions so that thin, flexible flanged portions of the bead placing means are between the inner circumference of the tire beads and the fabric end portions with the clamping means pressing out against the fabric end portions, withdrawing the flanged portions of the bead placing means from between the inner circumference of the tire beads and the fabric end portions to leave the beads resting and positioned on the end portions, lapping said fabric ends over said beads, wrapping a tire tread over said fabric layers, beating said tread sequentially across the tread face at a multiplicity of points, the drum being rotated so that the hammer blows strike progressively around the drum circumference, contracting said drum, and removing the tire casing therefrom.

2. A tire building machine comprising an expandable drum with cylindrical supporting means on the drum shaft, pneumatic annuli disposed around said supporting means, a multiplicity of segments over said annuli, resilient circumferential constraining means disposed around said segments, means to inflate said annuli, bead placing means comprising annular rings with thin inwardly directed, axial flanges thereon adapted to receive tire beads so that the beads rest on the relatively thin flanges and against the face of the ring, said rings fitting over the ends of the drum and being retractible therefrom, means to advance and retract said bead placing means, fabric lapping means for turning the end portions of the fabric layers over the tire beads comprising a multiplicity of finger pieces disposed adjacent the end portions of the drum, means for guiding and supporting said finger pieces, resilient constraining means through the nose portion of said finger pieces, means to move and actuate said finger pieces in and out to turn the fabric ends over the tire beads, and tread stitching means comprising a multiplicity of beating members mounted in a row intermediate mounting plates and actuating means whereby each member successively strikes and beats the tread.

3. In a tire building operation, the method of accurately placing tire beads on the end portions of fabric layers disposed around a drum which comprises placing the tire beads on resilient fingers of annular bead rings, disposing the bead rings over the fabric end portions, expanding a multiplicity of circumferentially disposed pressing means out against the fabric end portions so that the fabric end portions press radially outward against the inner circumferential surface of the tire beads and pinch the resilient fingers between the inner circumferential surface of the tire beads and the fabric end portions, and withdrawing the bead rings and resilient fingers of the bead rings from between the inner circumferential surface of the tire beads and the fabric end portions to leave the beads over the fabric end portions with the pressing means pressing out against the fabric end portions and positively positioning the beads therewith.

4. In a tire building machine bead placing means comprising rings with a multiplicity of circumferentially disposed relatively thin, inwardly directed, axially aligned flanges for receiving the tire beads, said rings fitting over the ends of the drum and the width of the beads being greater than the width of the flanges.

5. In a tire building machine, bead placing means comprising an annular ring with a multiplicity of resilient fingers disposed about the face thereof extending substantially parallel to the axis of the drum of the tire building machine and toward the center of the drum.

6. In a tire building machine, bead placing means comprising an annular ring with a multiplicity of resilient fingers disposed around the face thereof extending substantially parallel to the axis of the drum of the tire building machine and toward the center of the drum so that tire beads fit over and rest upon said fingers and against the ring face, the width of the beads being greater than the width of the fingers so that when the beads are fitted over the fingers and against the ring face, portions of the bead extend out and over the finger ends.

7. In a tire building machine, a tread beating mechanism comprising a multiplicity of beating members mounted on a shaft with cams thereon intermediate supporting plates, a guide rod mounted between said plates guiding and supporting the nose portions of said beating members, and driving means to drive said shaft, each cam on said shaft corresponding with a beating member and being so set that the beating members strike successively across the face of the tread.

8. In a tire building machine, tread stitching means comprising a cam shaft mounted between two mounting plates, a multiplicity of cams on said shaft, a multiplicity of hammer bodies journaled on said cams, a multiplicity of hammers attached to said hammer bodies, a slot in the outer portion of said hammer and hammer body assembly, a guide rod mounted on mounting plates through said slots, and driving means for said shaft, said cams being set so that the hammers successively strike across the tread face as the shaft is rotated.

9. The tread stitching means of claim 8 in which the hammers are spring mounted on the hammer bodies.

10. In a tire building machine, a tread beating mechanism comprising a multiplicity of cam-mounted beating members mounted in a row intermediate mounting plates, driving means for said beating members whereby each member successively strikes and beats the tread, and control means whereby the tire drum automatically is slip driven when the beating mechanism is in the operative position.

11. In a tire building machine, an expandable drum comprising cylindrical supporting means, pneumatic annuli disposed around said supporting means, a multiplicity of interfitting segments disposed over said annuli, resilient circumferential constraining means disposed around said segments, and means to inflate and deflate said pneumatic annuli.

12. In a tire building machine, an expandable drum comprising a cylindrical center spider with a central circumferential groove therein mounted on the drum shaft, a multiplicity of center segments with a radially inward central bend therein fitting into said circumferential groove, circumferential constraining means disposed around said center segments in the middle bend thereof, drum spiders adjustably mounted on the drum shaft on each side of the center spider, pneumatic annuli disposed around said drum spiders, a multiplicity of end segments disposed around said pneumatic annuli, constraining means disposed on said end segments, and means to inflate and deflate said pneumatic annuli, said center segments and said end segments interfitting in the expanded and contracted drum positions to form a regular cylindrical surface.

13. In a tire building machine, an expandable drum comprising a web structure with a cylindrical surface with a central circumferential groove therein mounted on the drum shaft, drum spiders with cylindrical surfaces slidably mounted and axially adjustable on the drum shaft on either side of said web structure, pneumatic annuli disposed around said drum spiders, web segments with a radially inward central V bend therein disposed over said annuli and around said web structure with the central bend of said segments fitting into the circumferential groove of said web structure, resilient constraining means fitting into the V bend of said spanning segments, end segments with radially inward end flanges thereon with a constraining means support thereon disposed over said pneumatic annuli and around said drum spiders, constraining means in said constraining means support, means to inflate and deflate said pneumatic annuli, and means to axially adjust said drum spiders, said web segments and end segments interfitting in the expanded and contracted drum positions to form a regular cylindrical surface thereon.

14. In a tire building machine with at least one slotted end cylinder, fabric lapping means for turning the end portions of fabric layers over tire beads comprising a multiplicity of finger pieces disposed circumferentially around the slotted end cylinder, resilient constraining means through the forward portion of said finger pieces, a link pivoted onto each finger piece toward the rear portion thereof each link in turn being pivoted on a sliding collar inside the slotted end cylinder, an adjustable restraining ring around the outer edge portion of the slotted cylinder to restrain the finger pieces in their initial upward and forward movement, and means to move said collar axially in and out.

15. In a tire building machine with a central drum shaft and a drum annuli supporting piece mounted on said shaft, fabric lapping means for turning the end portions of the fabric layers over tire beads disposed on the tire building drum circumference comprising a flanged collar slidable on the drum shaft, a plurality of links disposed about the collar circumference and pivoting on the flange portions thereof, finger pieces pivoted between their middle and rear portions with said links, a slotted cylinder bolted to the drum annuli supporting piece with slots therein for each finger piece, said finger pieces having rounded, beveled nose portions, a garter spring through the nose portions of said finger pieces, an arcuate slot in each finger piece relatively near the pivot point with the link, a check rod on the link fitting into said finger slot, an adjustable restraining ring around the outer edge portion of the slotted cylinder to restrain the finger pieces in their initial upward and forward movement, and means to move said flanged collar in and out on the drum shaft.

16. In a tire building machine, fabric lapping means comprising a multiplicity of fingers disposed around cylindrical supporting and guiding means, a garter spring through the nose portion of said fingers, an axially movable collar, a multiplicity of connecting pieces pivoted at one end on said collar and on the other end on said fingers, a lost motion connection between said fingers and said connecting pieces, an adjustable restraining ring around the end portion of said cylindrical supporting and guiding means, and means whereby said collar is axially moved in and out.

17. In fabric lapping means of a tire building machine in which a finger is restrained by an annular spring therein, the improvement which comprises a nose portion extending axially centerward beyond the annular spring therein.

18. The method of turning the end portions of fabric layers over the tire beads comprising simultaneously moving centerward and outward a plurality of finger pieces disposed about the drum circumference with resilient constraining means through the nose portions thereof so as to lift outward the end portions of the fabric layers disposed over said finger pieces and lap said end portions over the tire beads onto the building drum as said finger pieces move centerward, and finally withdrawing said finger pieces.

19. The method of claim 18 in which the tail portion of the finger pieces are restrained so that the nose portion lifts outward in advance of the tail portion.

20. In the tire building operation, the method of turning the end portions of fabric layers disposed circumferentially around the tire building drum over tire beads disposed over the fabric layer end portions adjacent the drum shoulders comprising the steps of moving horizontally centerward and radially outward a plurality of lapping means disposed circumferentially adjacent the drum shoulders to lift the fabric end portions horizontally centerward and radially outward over the tire beads and lap them onto the fabric layer on the drum and finally withdrawing said lapping means, said lapping means being subject to radially centerward forces throughout the operation.

21. In a tire building operation the method of stitching tire tread upon fabric layers disposed around a drum comprising the steps of disposing the tread over the fabric layers around the drum, beating and striking said tread at a multiplicity of points with beating means of relatively small tread-contact area, the tread contact point on the beating means approximately describing an ellipse as it follows its cycle, the drum being allowed to rotate so that the tread is stitched progressively around the drum circumference.

22. In a tire building operation, the method of stitching tire tread upon fabric layers disposed around a drum comprising the steps of disposing the tread over the fabric layers around the drum, beating and striking said tread sequentially at a multiplicity of points in an axial row across the tread face, the forces from striking and beating said tread rotating the drum to stitch the tread progressively around the drum circumference.

23. In a tire building operation, the method of stitching tire tread upon fabric layers disposed around a drum comprising the steps of disposing the tread over the fabric layers around the drum, beating and striking said tread in sequence across the tread face on axes substantially parallel to the major axis of the drum at a multiplicity of points with the beating means having relatively small tread contact area, the forces from striking and beating said tread rotating the drum to stitch the tread progressively around the drum circumference.

24. The method of claim 23 in which the drum is slip-driven throughout the tread stitching operation.

25. A method of building a pneumatic tire casing on a drum comprising the steps of disposing a plurality of fabric layers around the drum with end portions of the fabric layers extending beyond the shoulders of the drum, disposing tire beads adjacent the drum shoulders and over the fabric end portions, radially expanding the drum and fabric layers to press and wipe the fabric end portions against the tire beads, lapping said fabric end portions over said beads, disposing tire tread around the drum and over the fabric layers, beating said tread at a multiplicity of points in axial row across the tread face to stitch said tread to the fabric layers, contracting the drum, and removing the casing thus formed therefrom.

26. The method of building a pneumatic tire casing comprising the steps of disposing a plurality of fabric layers over a drum with end portions of the fabric layers extending beyond the shoulders of the drum, disposing tire beads on circumferentially disposed, horizontally extending relatively thin flanges adjacent the drum shoulders and over the fabric end portions, radially expanding the drum and fabric layers to press and wipe the fabric end portions against the tire beads and to pinch the bead supporting flanges between the fabric end portions and the inner circumferential surface of the tire beads, withdrawing the relatively thin flanges, disposing tire tread around the drum and over the fabric layers, beating and striking said tread sequentially across the tread face at a multiplicity of points, the forces from striking and beating said tread rotating the drum to stitch the tread onto the fabric layers progressively around the drum circumference, contracting the drum, and withdrawing a tire casing.

27. In a tire building machine an expandable drum comprising a cylindrical supporting means mounted on the drum shaft, pneumatic annuli disposed around said supporting means, a multiplicity of segments over said annuli, resilient constraining means disposed around said segments, means to inflate said annuli, bead placing rings at the drum ends comprising annular rings with a multiplicity of resilient fingers disposed about the face thereof extending parallel to the axis of the drum and toward the center thereof, means to advance and retract said bead placing means, fabric lapping means comprising a multiplicity of finger pieces disposed circumferentially around a slotted end cylinder, resilient constraining means through the forward portion of said finger pieces, a link pivoted onto each finger piece toward the rear portion thereof each link in turn pivoted at the outer end on a sliding collar on the drum shaft, means to move said collar in and out on the drum shaft, and tread stitching means comprising a cam shaft substantially parallel to the horizontal axis of the drum mounted between two mounting plates, a multiplicity of cams on said shaft, a multiplicity of beating members journaled on said cams, a guide rod mounted between said plates guiding the nose portions of said beating members, driving means to drive said shaft, each cam on said shaft actuating a beating member, and means to bring said tread stitching means into stitching position over the drum.

28. The method of placing tire beads on the fabric end portions of fabric layers disposed around a tire building drum comprising the steps of disposing tire beads on resilient supporting means over the fabric end portions, radially expanding the drum and fabric layers to press and wipe the fabric end portions against the tire beads, and finally withdrawing the resilient supporting means to leave the tire beads positioned on the fabric end portions.

29. The method of placing tire beads on the fabric end portions of fabric layers disposed around a tire building drum comprising the steps of disposing the tire beads on circumferentially disposed, horizontally extending relatively thin flanges adjacent the drum shoulders and over the fabric end portions, radially expanding the drum and fabric layers to press and wipe the fabric end portions against the tire beads and to pinch the bead supporting flanges between the fabric end portions and the inner circumferential surface of the tire beads, and finally withdrawing the relatively thin flanges to leave the tire beads on the fabric end portions.

30. The method of claim 29 in which the circumferentially disposed, horizontally extending, relatively thin flanges are spaced apart so that on initial expansion the fabric end portions press in part against the relatively thin flanges and in part against the inner circumferential surface of the tire beads.

31. A tread beating mechanism comprising a shaft, a multiplicity of cams on said shaft, a multiplicity of beating members journaled on said cams, slots in said beating members, a guide and aligning rod parallel to said shaft and through the slots in said beating members, mounting means supporting said shaft and guide rod, and means to drive said shaft.

32. The apparatus of claim 16 in which there are rollers on the nose portion of the fingers and a series of rollers on the radially central portion of the fingers.

33. Fabric lapping means for turning the fabric end portions of fabric layers disposed on a tire building drum over tire beads disposed on the end portions comprising a multiplicity of finger pieces disposed circumferentially around the tire building drum and substantially aligned with the longitudinal axis of the drum, resilient constraining means through the forward portions of said finger pieces, finger piece actuating means, links pivoted at one end toward the rear portion of said finger pieces and at the other end onto the finger piece actuating means and guide and positioning means for said finger pieces.

HERMAN T. KRAFT.

REFERENCES CITED

The following references are of record in the file of this patent:

UNITED STATES PATENTS

| Number | Name | Date |
|---|---|---|
| 2,182,176 | Maranville | Dec. 5, 1939 |
| 2,313,035 | Breth | Mar. 9, 1943 |
| 2,455,038 | Breth | Nov. 30, 1948 |